United States Patent

Van Beek et al.

[15] 3,668,148
[45] June 6, 1972

[54] CATALYST PREPARED BY HOMOGENEOUS PRECIPITATION UNDER HIGH TEMPERATURE AND PRESSURE

[72] Inventors: Wilhelmus Petrus Van Beek; Theo Jan Osinga, both of Vlaardingen, Netherlands

[73] Assignee: Lever Brothers Company, New York, N.Y.

[22] Filed: Apr. 6, 1970

[21] Appl. No.: 26,051

[30] Foreign Application Priority Data

Apr. 9, 1969 Luxembourg...........................58391

[52] U.S. Cl............................252/440, 252/454, 252/459, 252/455 R, 252/461, 252/466 J, 252/473
[51] Int. Cl.........................................B01j 11/82, B01j 11/06
[58] Field of Search..............252/430, 466 J, 472, 459, 473, 252/440, 454, 461, 455 R

[56] References Cited

UNITED STATES PATENTS

| | | | |
|---|---|---|---|
| 3,207,702 | 9/1965 | Flank et al. | 252/459 X |
| 3,320,182 | 5/1967 | Taylor et al. | 252/466 J |

FOREIGN PATENTS OR APPLICATIONS

| | | | |
|---|---|---|---|
| 6,705,259 | 10/1968 | Netherlands | 252/466 J |

OTHER PUBLICATIONS

Gordon et al., Precipitation From Homogeneous Solution, Pub. by John Wiley & Sons, Inc., N.Y., N.Y. (1959) pages 6–9 & 43

*Primary Examiner*—Patrick P. Garvin
*Attorney*—Louis F. Kline, Jr., Melvin H. Kurtz and Edgar E. Ruff

[57] ABSTRACT

A process for preparing a catalyst comprising a metallic catalytic agent on a particulate carrier is disclosed which provides improved uniformity of distribution and fineness of division with narrowness of particle size distribution of the metallic catalytic agent on the carrier. The particles of carrier are suspended by agitation in an aqueous solution of a salt of the metallic catalytic agent and of a source, on heating in aqueous solution, of hydroxyl ions. The suspension is heated in a sealed vessel above 100° C to precipitate the metal or the particles with uniformity of distribution and fineness of division with narrowness of particle size distribution. The metal is converted by conventional procedures to the appropriate active, oxidized or reduced, state. The process is particularly significant with carriers, such as alumina and silica, that in alkaline media are liable to undergo structural charges.

5 Claims, No Drawings

CATALYST PREPARED BY HOMOGENEOUS PRECIPITATION UNDER HIGH TEMPERATURE AND PRESSURE

The present invention relates to a process for the production of a catalyst, which catalyst consists of a metallic catalytic agent in a porous carrier, and to catalysts obtained in this way.

Catalysts which consist of a metallic catalytic agent in a porous carrier have been known for many years. They are often referred to as "supported catalysts". The efficiency of such catalysts depends on a number of properties, such as activity, resistance to poisons, resistance to sintering and selectivity.

It has been found that such properties can be enhanced by using processes for the preparation of the catalyst which improve the uniformity of distribution, fineness of division and narrowness of particle size distribution of the catalytic agent in the porous carrier.

The activity of catalyst depends primarily on the surface area of the catalytic agent in relation to weight of catalyst, which surface must be easily accessible. Uniformity of distribution, fineness of division and narrowness of particle size distribution reduce the likelihood of the particles of metallic catalytic agent coalescing in the carrier. Coalescing is disadvantageous because it reduces the surface area and hence the activity of the metallic catalytic agent.

Also when for full activity the metallic catalytic agent has to be activated by reduction, the final activity depends on the amount of metallic compound reduced during activation. This quantity depends on the physical and chemical state, in particular on uniformity of distribution and fineness of division, of the metallic compound in the carrier.

As with activity, resistance to poisons is affected by the surface area of the catalytic agent. In general the larger the surface area the greater the resistance to poisons, i.e. the more poison required to make the catalyst inactive.

Resistance to sintering similarly depends on uniformity of distribution and fineness of division. Resistance to sintering is particularly important when high temperature activation, for example high temperature reduction, is necessary. Usually the degree of reduction achieved is greater at higher reduction temperatures. In general with catalysts with high resistance to sintering a higher active surface area can be retained than with catalysts whose resistance to sintering is lower.

In various catalytic processes it is important for the catalyst used to have a high selectivity. For example, in hydrogenation processes, in which two or more double linkages are hydrogenated successively, it is important that hydrogenation is carried out in successive stages in order to obtain partially hydrogenated compounds which are free from more saturated compounds. This selectivity depends on the structure of the catalysts as well as on the nature of the catalytic agent. Thus, for the selective hydrogenation of triglycerides derived from polyunsaturated fatty acids, catalysts with a nickel or copper base are often used, each of which has a specific and different selectivity for this type of hydrogenation. Usually this selectivity increases with the dimension of the pores of the carrier. When these catalysts are produced, it is preferred to start with a carrier whose pores have the required dimension and whose structure is maintained as far as possible throughout these operations. Uniformity of distribution, fineness of division and narrowness of particle size distribution aid maintenance of the required dimensions and structure.

A great many processes for the preparation of such catalysts mounted on carriers have been proposed. The most significant proposals can be classed as follows.

First, processes in which a hydroxide of the catalytic agent is precipitated from an aqueous solution of one of its salts on to the carrier in suspension in this solution by the addition of a basic compound, such as an alkaline carbonate or hydroxide or ammonia. Then the carrier bearing the hydroxide precipitated from the aqueous solution is separated, after which it is washed, if necessary, and dried. The disadvantage of such processes is that a significant proportion of the catalytic agent fails to be precipitated on to the carrier. Furthermore, the quality of the catalysts prepared in this way depends not only on the nature of the reagents but also on the way they are added and the pH and temperature conditions during their addition. It is very difficult, especially on an industrial scale, to obtain catalysts of constant quality.

According to a second type of process, the carrier is impregnated with an aqueous solution of a salt of a metallic catalytic agent, preferably a nitrate, then the impregnated mass is dried and heated to a high temperature to decompose the salt and form, if necessary after reduction, the metallic catalytic agent. It has the disadvantage that during drying, the aqueous solution containing the salt moves to the outer surface of the carrier so that the catalytic agent is not uniformly distributed in the catalyst obtained.

Both types of process have the disadvantage that it is practically impossible for the catalytic agent to be deposited very finely and with narrow particle size distribution.

In further proposed processes the metal is precipitated from solution on to the carrier by allowing hydroxyl ions to develop in this solution and not by adding such ions as above. Netherlands patent application No. 6705259 describes such a process in which the precipitation is effected by heating a suspension of the carrier in an aqueous solution of the metal salt and urea or a similar nitrogen compound. Heating brings about the decomposition of the urea, the pH of the solution is increased by the effect of the freed ammonia and the metal is precipitated on the surface of the carrier particles. In such a process evaporation of the solution can occur and this, it has now been appreciated, leads to lack of uniform distribution over the carrier and only partial attainment of fine particle size and narrowness of particle size distribution.

The aim of the present invention is to provide a process which gives improved uniform distribution and fineness of division with narrow particle size distribution of the catalytic agent on the carrier.

In general it has been proposed to use a considerable excess of urea, or similar nitrogen compound, to metal. It is further aim of the present invention to provide a process in which only a small if any excess is required.

In Netherlands patent application No. 6705259 it is stressed that the hydroxyl ions should be formed gradually so that the speed at which the agent which is to be precipitated on to the surface of the carrier is conveyed is sufficiently high to avoid the formation of precipitation centers in the solution, this speed of travel being determined by the degree to which the solution is agitated and by the extent to which the solid carrier is divided in the suspension. During industrial preparation of these catalysts in particular, it is important that the reaction time should be as limited as possible, and therefore precipitation should be effected as quickly as possible, i.e. the hydroxyl ions should be formed as soon as possible.

On the basis of the criterion specified in the above-mentioned application, i.e. that hydroxyl ions should be formed gradually, it might therefore be expected that, the conditions of agitation of the solution and the degree of division of the carrier being otherwise constant, a faster formation of hydroxyl ions, for example a faster hydrolysis of the urea, would give a poorer quality catalyst, because in this case a fraction of the catalytically active agent would be precipitated in the solution and not on the carrier.

It has now been surprisingly discovered that the aqueous urea or other nitrogen compound solution can be heated to a temperature which is higher than the boiling point of the aqueous solution without disadvantageously affecting the final quality of the carrier.

According to the invention, a catalyst which consists of a metallic catalytic agent in a porous carrier is prepared in which the catalytic agent is distributed uniformly and in a finely divided state with narrow particle size distribution in the carrier, by suspending by agitation particles of the carrier in an aqueous solution of a salt of the catalytic agent and of a source, when heated in aqueous solution, of hydroxyl ions;

and heating the solution above 100° C. in a sealed vessel to allow sufficient hydroxyl ions to develop to precipitate the metal.

Heating above 100° C. enables short reaction times to be used, which is very advantageous industrially. Heating the solution in a sealed vessel ensures that water vapor formed does not escape freely thus causing the dessication of the carrier which must be avoided. The vessel can be sealed in various ways. Thus the vessel can be completely gas-tight, in which case an autoclave or similar apparatus capable of resisting the high levels of pressure attained must be used. Alternatively, sufficient impermeability can be ensured by use of a piston flap valve system or a similar system which allows carbon dioxide or any other gas liberated, for example by decomposition of the nitrogen compound, to be released into the atmosphere. Some steam is of course carried along but this release can be limited to a permissible degree by ensuring that the valve or piston system closes under a given pressure, for example, by means of a spring.

The process can advantageously be continuous.

"Metallic catalytic agent" here means a metal that has or promotes catalytic activity in the reduced or oxidized state.

Examples of metals that can be prepared as metallic catalytic agents according to the invention include beryllium, copper, gold, zinc, cadmium, mercury, aluminum, titanium, zirconium, hafnium, germanium, tin, lead, vanadium, niobium, tantalum, antimony, bismuth, chromium, molybdenum, tungsten, manganese, iron, cobalt, nickel, ruthenium, rhodium, palladium, osmium, iridium, platinum, thorium, uranium and rare earth metals. Textbooks and general literature provide copious illustrations of further catalysts that consist of metallic catalytic agents in porous carriers. Reference can be made for example to "Catalysis", Ed. Emmett, particularly Chap. I, Vol. II, 1955, Reinhold.

Suitable carriers are well known in the literature. Examples include diatomaceous earths (e.g. kieselguhr), pumice, porcelain, silica, asbestos, alumina, charcoal, kaolin, other silicates, infusorial earth, magnesium and barium sulphates and magnesia. Typical surface areas of such carriers lie within the range of 4 to 1,000 sqm/g.

The process of the invention is particularly advantageous for the production of catalysts in which the carrier is insufficiently stable in alkaline conditions, as in the case of silica and alumina. In the generally acid conditions of the process according to the invention, structural changes in silica and alumina are much less likely than in proposed processes.

Silica or alumina catalysts, useful for instance for the selective hydrogenation of polyunsaturated triglycerides, should preferably have pores mainly with a diameter of more than 25 A. and preferably more than 80 A. A particular advantage of the invention is that catalysts with such pore structure can be prepared consistently.

Which salt of the metal to use in the process of the invention is mainly determined by the solubility of the salt in water. Water solubilities are given, for example, in "Handbook of Chemistry and Physics", Chemical Rubber Publishing Co. To prepare catalysts with a high catalytic agent content an aqueous solution with a high concentration of a salt of the required catalytic metal should preferably be used. If no sufficiently soluble salts are available, precipitation can be repeated one or more times. A second factor which influences the choice of metal salt to be used is if washing of the carrier bearing the metallic catalytic agent is required before drying. In industrial production of catalysts it is important to simplify the process as much as possible and therefore not to wash. So a salt should be used which leaves no residue in the catalyst which could have an adverse effect on its properties.

It should be noted that the metallic catalytic agent can be a mixture. A catalyst containing such a mixture can be prepared according to the invention either by using a mixture of salts or more than one precipitation.

There are many convenient sources of hydroxyl ions. All that is required is that hydroxyl ions develop on heating and that the source of hydroxyl ions is water-soluble. Particularly convenient as sources of hydroxyl ions are organic nitrogen compounds that hydrolize when heated in an aqueous medium to form ammonia or primary or secondary amines. Examples of appropriate compounds of this type are urea, but other amides, such as formamide, dimethylformamide, dimethylacetamide and acetamide, are also suitable.

Compounds which are particularly suitable have the general formula:

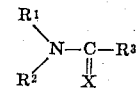

where $R^1$ and $R^2$ each independently are hydrogen or a $C_1$ to $C_5$ alkyl group or, when taken together, are $—(CH_2)_4—$, $-(CH_2)_5—$ or $—(CH_2)_2—O—(CH_2)_2—$; X is O or $=NH$; and $R^3$ is H, or $C_1$ to $C_5$ alkyl group or $—NR^1R^2$.

Another substance which can be used to provide hydroxyl ions is hexamethylene tetramine.

The metal is usually precipitated on the surface of the carrier particles in the form of a hydroxide but sometimes it is preferable to precipitate it in the form of a basic salt, in which case it is advisable to see that the solution contains anions of a suitable acid. These anions can be present just as they are in the aqueous solution (e.g. in the form of a catalytic metal salt) or they can be formed during the same decomposition process which liberates the hydroxyl ions. Basic salts which can be precipitated in this process are, for example, basic iron formate (III) in which case the formate ions can for example be formed by means of formamide as the source of hydroxyl ions. Because metal salts are usually expensive, complete or almost complete precipitation of the metal is preferred.

Prior proposals have required the use of a considerable excess of the source of hydroxyl ions to the metal salt. Using a process according to the invention only slight, if any, stoichiometric excess of source of hydroxyl ions need be used, i.e. ratio of source to metal from 1 to 4:1, although, of course, larger quantities can be used.

In order to guarantee a sufficiently short reaction time on the one hand and maintain the pressure in the apparatus in which heating is carried out within reasonable limits on the other, it is desirable to select a reaction temperature of 110° to 250° C and preferably 125° to 200° C.

After the metal has been precipitated on the surface of the carrier particles, in the form for example of its oxide, hydroxide or basic salt, it is necessary to ensure that it is in the form in which it best displays the appropriate catalytic activity. Various metals are active in oxidized or reduced state. The appropriate form for each metal catalyst is very well known as are ways of converting the precipitate into the appropriate form. Any general inorganic textbook is a suitable guide. In general it will be necessary to dry the carrier containing the precipitate. As indicated above a washing step prior to the drying step can also be included.

Some metals are active as prepared in the oxidized or reduced state but often an activation step is advisable. Suitable activation processes are very well known is indicated for instance in Kirk Othmer "Encyclopedia of Chemical Technology", Interscience, 1949, Vol. 3, page 267. Examples include thermal treatment at temperatures of 120° to 800° C. and reduction, also usually at high temperatures, by means of hydrogen or other reducing agents.

Such activation processes can sometimes be performed without an intermediate drying step. Alternatively the carrier particles with the precipitate can be dried, often after washing, and then activated. Activation can also occur, either of dried carrier or of carrier in water, in a reaction medium on which the catalyst is to act.

Because of this and because the quality of catalysts often diminishes rapidly on storage and because activated catalysts are often pyrophoric, it is often preferable to present the catalysts for storage or for sale, for example, in the non-activated state. The term "catalyst" used herein therefore means activated catalyst, catalysts that do not require activation before use and non-activated catalysts that require activation before use.

It is a particular feature of the present invention that nickel catalysts so prepared have, surprisingly, activity in the synthesis of ammonia. Also it is a feature that iron catalysts so prepared have a surprising activity in the synthesis of ammonia.

The invention is illustrated by the following examples:

EXAMPLE 1

To a stirred suspension of 50 g of a macroporous silica, having a specific surface of 290 m$_2$/g, in 500 ml of distilled water, was added a solution of 75 g of nickel nitrate (Ni(NO$_3$)$_2$ 6 H$_2$O) and 50 g of urea in 1,500 ml of water. The suspension obtained was pumped at 700 ml/h through a tube, 7.2 m long and with a diameter of 3 mm, which tube was heated at 180° C. The product was cooled, filtered, washed repeatedly with water and dried for 16 hours at 90° C. to give a composition having a nickel content of 18.2 percent. Activation of this composition was achieved by reducing it for 4 hours in a tube furnace at 450° C. and in a hydrogen flow at a rate of 60 l/h per g nickel. The properties of the catalyst are shown in Table 1.

EXAMPLE 2

To a stirred suspension of 50 g of a macroporous silica, having a specific surface of 290 m$^2$/g, in 500 ml of distilled water was added a solution of 75 g of nickel nitrate (Ni(NO$_3$)$_2$ 6 H$_2$O and 16 g of urea in 1,500 ml of water. The suspension obtained was pumped at 700 ml/h through a tube 7.2 m long and with a diameter of 3 mm, which tube was heated at 180° C. The product was cooled, filtered, washed repeatedly with water and dried for 16 hours at 90° C. to give a composition having a nickel content of 18.3 percent. Activation of this composition was achieved by reducing it for 4 hours in a tube furnace at 450° C. and in a hydrogen flow at a rate of 60 l/h per g nickel. The properties of the catalyst are shown in Table 1.

EXAMPLE 3

To a stirred suspension of 50 g of a macroporous silica, having a specific surface of 290 m$^2$/g in 500 ml of distilled water, was added a solution of 42 g of vandyl sulphate (VOSO$_4$ 5 H$_2$O) and 39.8 g of urea in 1500 ml of water. The suspension obtained was pumped at 700 ml/h through a tube 7.2 m long and with a diameter of 3 mm which tube was heated at 180° C. The product was cooled, washed repeatedly with water and dried for 16 hours at 90° C.

EXAMPLE 4

After mixing 75 g of a macroporous silica, having a specific surface of 290 m$^2$/g, with a solution of 409 g of nickel nitrate (Ni(NO$_3$)$_2$ 6 H$_2$O) and 93 g of urea in 635 ml of distilled water, a 1 l autoclave was filled for 75 percent of its volume with the suspension obtained. While stirring vigorously the closed autoclave was gradually heated in 66 minutes to a maximum temperature of 160° C. during which the maximum pressure observed was 42 atm.

The autoclave was then cooled to 73° C. over 83 minutes after which the impregnate was removed from the autoclave, washed with hot water and dried for 40 h at 90° C. to give a composition having a nickel content of 32.0 percent. Activation of this composition was achieved by reducing it for 4 hours in a tube furnace at 450° C. and in a hydrogen flow at a rate of 60 l/h per g nickel. The properties of this catalyst are shown in Table 1.

EXAMPLE 5

After mixing 75 g of a macroporous silica, having a specific surface of 290 m$^2$/g, with a solution of 370 g of nickel sulphate(NiSO$R_4$ 6 H$_2$O) and 90 g of urea in 635 ml of distilled water, a 1 l autoclave was filled for 75 percent of its volume with the suspension obtained. While stirring vigorously the closed autoclave was gradually heated in 33 minutes to a minimum temperature of 160° C. during which the maximum pressure observed was 42 atm.

The autoclave was then cooled to 48° C. over 131 minutes after which the impregnate was removed from the autoclave, washed with hot water and dried for 132 h at 90° C. to give a composition having a nickel content of 38.0 percent. Activation of this composition was achieved by reducing it for 4 hours in a tube furnace at 450° C. and in a hydrogen flow at a rate of 60 l/h per g nickel. The properties of this catalyst are shown in Table 1. Because of sulphate left after the washing step the catalyst contained 1.6 percent sulphur based on weight of nickel.

EXAMPLE 6

In a 2-liter stainless steel autoclave, equipped with an efficient magnetic agitator, a temperature reading device for the interior of the autoclave and a cut-off cock, were fed successively:

25 g of spherical amorphic silica with a specific surface of 170 sq.m/g
75 g of nickel nitrate (Ni(NO$_3$)$_2$ 6 H$_2$O)
100 g of urea
750 ml of distilled water.

After closing the autoclave and starting up the agitator, the autoclave was heated as quickly as possible until its internal temperature was about 150° C. and this temperature was maintained for about 45 minutes while continuing to stir. After cooling to a temperature of about 50° C. and releasing the pressure, the autoclave was opened. The still hot suspension was filtered and the filter cake washed several times with water after which it was dried for 16 hours at 200° C. in order to obtain a composition with a nickel count of about 19.4 percent. The compound was activated for 4 hours at 450° C. in a current of hydrogen. The catalyst obtained had the following properties:

Specific surface of nickel(determined according to the technique of J.W.E. Coenen, Delft thesis 1918):
260 sq. m/g of nickel
Degree of reduction (reduced Ni ratio : total Ni, according to the technique of B.G.Linsen, Delft thesis, 1964) : 78.5 percent
Activity — benzene (number of millimoles of benzene converted per minute and per g of nickel during hydrogenation of gaseous benzene control conditions): 3.2. Average granulometry (determined by hydrogen chemisorption) : 25 A.

TABLE I

| Properties | Catalyst of example 1 | 2 | 4 | 5 |
|---|---|---|---|---|
| Percentage of nickel | 18.2 | 18.3 | 32.0 | 38.0 |
| Specific Ni-surface m.$^2$/g. Ni total | 176 | 233 | 183 | 80 |
| Mean size of the nickel crystallites determined by means of hydrogen adsorption | 21A | 16A | 18A | 42A |
| Degree of reduction | 84.9% | 83.6% | 76.2% | 76.7% |
| Activity (benzene) | – | – | 2.7 | – |

Table II gives further examples of supported catalysts that can be prepared according to the invention and reactions which the catalysts can be used to catalyze.

TABLE II

| Example | Metallic catalytic agent | Carrier | Precipitant | Salt | Example of reaction catalyzed |
|---|---|---|---|---|---|
| 7 | Cobalt | Alumina | Urea | $Co(NO_3)_2.6H_2O$ | Hydrogenation.[1] |
| 8 | do | Magnesium Hydroxide Carbonate | do | $Co(NO_3)_2.6H_2O$ | Reduction.[2] |
| 9 | Iron/nickel | Silica | do | $Ni(NO_3)_2.6H_2O$ / $Fe(NO_3)_3.9H_2O$ | $N_2+3H_2 \rightarrow 2NH_3$ |
| 10 | Chromium (oxide) | Alumina | do | $CrCl_3$ | Dehydrogenation.[3] |
| 11 | Ruthenium | do | do | $RuCl_3$ | $CO+H_2 \rightarrow CH_4$ |
| 12 | Molybdenum (oxide) / Iron oxide | Silica | do | ([4]) | $CH_3OH \rightarrow HCHO$ [5] |
| 13 | $V_2O_5$ | Alumina | do | $VOSO_4$ | Oxidation.[6] |
| 14 | Tin oxide / $V_2O_5$ | Silica | do | $SnCl_2.2H_2O$ / $VOSO_4$ | Do.[7] |
| 15 | $Al_2O_3$ | do | do | $Al_2(SO_4)_3$ | Oil washing. |
| 16 | Molybdenum (oxide) / Bismuth oxide | do | do | ([8]) | Acrolein $\rightarrow$ acrylonitrile. |
| 17 | Molybdenum / Zinc | do | do | ([9]) | |
| 18 | Tungsten / Zinc | do | do | ([10]) | |
| 19 | Beryllium | do | do | $BeSO_4.2H_2O$ | |
| 20 | $Bi_2O_3$ / $Fe_2O_3$ | do | do | $Bi(NO_3)_3.5H_2O$ / $Fe(NO_3)_3.9H_2O$ | Oxidation of $NH_3$. |
| 21 | Cadmium | Alumina | do | $CdCl_2.H_2O$ | Fatty alcohols from fatty acids. |
| 22 | Cobalt | $TiO_2$ | do | $Co(NO_3)_2.6H_2O$ | Hydrogenation. |
| 23 | Cobalt / Zinc | Silica | do | $Co(NO_3)_2.6H_2O$ / $Zn(NO_3)_2.6H_2O$ | |
| 24 | Cobalt / Chromium | Alumina | Urea | $Co(NO_3)_2.6H_2O$ / $Cr(NO_3)_3.9H_2O$ | Hydrogenation. |
| 25 | Erbium | Silica | do | $Er(NO_3)_2.5H_2O$ | |
| 26 | Iron | do | DMA [11] | $Fe(NO_3)_3.9H_2O$ | $CO + H_2O \rightarrow CO_2 + H_2$ |
| 27 | do | do | DMF [12] | $Fe(NO_3)_3.9H_2O$ | |
| 28 | Iron oxide / Chromium oxide | $ZnCO_3$ | Urea | $Fe(NO_3)_3.9H_2O$ / $Cr(NO_3)_3.9H_2O$ | Dehydrogenation. |
| 29 | $HfO_2$ | Silica | do | $HfOCl_2.8H_2O$ | Cracking of hydrocarbons. |
| 30 | Gallium | do | do | $Ga(NO_3)_2$ | |
| 31 | Manganese oxide | do | do | $MnF_3$ | Oxidation. |
| 32 | Nickel | Kaolin | do | $Ni(NO_3)_2.6H_2O$ | $CO \rightarrow CH_4$ |
| 33 | do | Silica | HMT [13] | $Ni(NO_3)_2.6H_2O$ | |
| 34 | do | Asbestos | Urea | $Ni(NO_3)_2.6H_2O$ | |
| 35 | Thorium | Silica | do | $Th(NO_3)_4.6H_2O$ | Fischer-Tropsch. |
| 36 | Ytherbium | do | do | $Yb(NO_3)_3.5H_2O$ | |
| 37 | PbO | do | do | | Synthesis of methanol. |
| 38 | Rhenium | Active coal | do | | Pressure hydrogenation of fuels. |
| 39 | Rhodium | Alumina | do | | Dehydrogenation. |
| 40 | Platinum | Silica | do | | Catalytic reforming. |
| 41 | Iridium | Magnesia | do | | Pressure hydrogenation of coal. |
| 42 | Antimony | do | do | | Oxidation of ethylene. |
| 43 | Scandium | Silica | do | $Sc(NO_3)_3.9H_2O$ | |
| 44 | Samarium | do | do | $Sm(NO_3)_3.5H_2O$ | |
| 45 | Thallium | do | do | $TlCl_3$ | |

1. After activation at 500° C. for 4 h with hydrogen such a catalyst is more active for the hydrogenation of benzene than a catalyst prepared by boiling an ammoniacal solution of cobalt nitrate to precipitate the cobalt in an alumina support.
2. For example reduction of azelaic acid dinitrile in ammonia and hydrogen.
3. For example conversion of cyclohexane or n-hexane to benzene.
4. A solution obtained by reducing $Na_2MoO_4$ with iron and HCl and then filtering off excess iron is used.
5. Such a catalyst after activation at 500° C. for 4 h in air gives a much higher conversion rate per unit weight molybdenum than a commercial catalyst.
6. For example in the oxidation of o-xylene such a catalyst is more selective than a commercial catalyst.
7. For example in the oxidation of toluene to benzoic acid such a catalyst after activation is more selective and more active than a tin vanadate catalyst prepared according to J.K.Chowdhury and S.C.Chowdhury, J.Indian Chem.Soc., 11, 194 (1934).
8. A solution of $Na_2MoO_4$ is reduced with zinc and filtered. To the filtrate is added $Cr(NO_3)_3.9H_2O$.
9. A filtrate after reduction of $Na_2MoO_4$ with zinc is used.
10. A filtrate after the reduction of $Na_2WO_4$ with zinc is used.
11. Dimethylacetamide.
12. Dimethylformamide.
13. Hexamethylene tetramine.

We claim:

1. A process for preparing a catalyst, said catalyst consisting of a metallic catalytic agent on a particulate carrier selected from the class consisting of diatomaceous earthes, pumice, porcelain, silica, asbestos, alumina, kaolin, infusorial earth, magnesium sulphate, barium sulphate and magnesia in which process
   1. particles of said carrier are suspended by agitation in an aqueous solution of
      a. a water-soluble salt of the metallic catalytic agent, and
      b. a source of hydroxyl ions selected from the class consisting of hexamethylene tetramine, urea, formamide, dimethyl formamide, acetamide and dimethyl acetamide which on heating in aqueous solution develop hydroxyl ions; and
   2. said particles in said aqueous solution are heated in a sealed vessel to between 110° C. and 250° C. to develop sufficient hydroxyl ions to precipitate the metal on the surface of said particles so that, on conversion of the metal to the active, metallic catalytic agent, form said metallic catalytic agent is distributed uniformly and in a finely divided state with narrow particle size distribution on the carrier.

2. A process as claimed in claim 1 in which the particles in the aqueous solution are heated in the sealed vessel to between 125° C. and 200° C.

3. A process as claimed in claim 1 in which the mole ratio of said source of hydroxyl ions to said metal is between 1 : 1 and 4 : 1.

4. A process as claimed in claim 1 in which the particulate carrier is selected from the class consisting of silica and alumina.

5. A process as claimed in claim 1 in which the metallic catalytic agent is nickel.

* * * * *